(12) United States Patent
Matsunaga

(10) Patent No.: US 12,377,846 B2
(45) Date of Patent: Aug. 5, 2025

(54) FOLLOW-UP TRAVEL SUPPORT DEVICE, FOLLOW-UP TRAVEL SUPPORT METHOD AND NON TRANSITORY RECORDING MEDIUM

(71) Applicant: TOYOTA JIDOSHA KABUSHIKI KAISHA, Toyota (JP)

(72) Inventor: Takahiro Matsunaga, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/191,215

(22) Filed: Mar. 28, 2023

(65) Prior Publication Data
US 2023/0382382 A1 Nov. 30, 2023

(30) Foreign Application Priority Data
May 26, 2022 (JP) .................. 2022-086075

(51) Int. Cl.
*B60W 30/165* (2020.01)
*B60W 40/02* (2006.01)
*B60W 50/14* (2020.01)

(52) U.S. Cl.
CPC .......... *B60W 30/165* (2013.01); *B60W 40/02* (2013.01); *B60W 50/14* (2013.01); *B60W 2050/146* (2013.01); *B60W 2554/4046* (2020.02)

(58) Field of Classification Search
CPC ..... B60W 2050/146; B60W 2540/215; B60W 2554/4023; B60W 2554/4046; B60W 30/16; B60W 30/165; B60W 40/02; B60W 50/08; B60W 50/082; B60W 50/14; H04W 4/46
See application file for complete search history.

(56) References Cited

U.S. PATENT DOCUMENTS

| | | | |
|---|---|---|---|
| 2016/0044571 A1* | 2/2016 | Choi .......... | H04W 8/085 370/235 |
| 2017/0243504 A1* | 8/2017 | Hada .......... | G06N 5/04 |
| 2018/0118223 A1* | 5/2018 | Mori .......... | B60K 35/80 |
| 2020/0339145 A1* | 10/2020 | Zhang .......... | B60W 30/095 |
| 2022/0234599 A1* | 7/2022 | Tsuji .......... | B60W 10/18 |

FOREIGN PATENT DOCUMENTS

| | | |
|---|---|---|
| JP | 2004034917 A | 2/2004 |
| JP | 2016512604 A | 4/2016 |
| JP | 2016197390 A | 11/2016 |
| WO | WO-2020065892 A1 * | 4/2020 |

OTHER PUBLICATIONS

Machine Translation of WO 2020065892 A1 obtained from Clarivate Analytics on Feb. 5, 2025 (Year: 2020).*

* cited by examiner

*Primary Examiner* — Fadey S. Jabr
*Assistant Examiner* — Michael J Herrera
(74) *Attorney, Agent, or Firm* — Hunton Andrews Kurth LLP

(57) ABSTRACT

The follow-up travel support device includes a processor configured to acquire information about surrounding vehicles around a host vehicle, select a preceding vehicle suitable as a follow-up target of the host vehicle based on the information about the surrounding vehicles, and propose to an occupant of the host vehicle a follow-up travel to the preceding vehicle by the host vehicle. The processor is configured to stop proposal of the follow-up travel when the follow-up travel is not started despite the proposal of the follow-up travel.

7 Claims, 6 Drawing Sheets

FOLLOW-UP TRAVEL SUPPORT DEVICE, FOLLOW-UP TRAVEL SUPPORT METHOD AND NON TRANSITORY RECORDING MEDIUM

CROSS-REFERENCE TO RELATED APPLICATION

The present application claims priority to Japanese Patent Application No. 2022-086075 filed on May 26, 2022, which is incorporated herein by reference in its entirety.

FIELD

The present disclosure relates to a follow-up travel support device, a follow-up travel support method, and a non-transitory recording medium.

BACKGROUND

PTL 1 discloses that, in a case where a preceding vehicle exists in front of the host vehicle, follow-up travel control is performed so as to follow the preceding vehicle so as to maintain a set inter-vehicle distance.

CITATIONS LIST

Patent Literature

[PTL 1] Japanese Unexamined Patent Publication No. 2004-034917

SUMMARY

Technical Problem

In the follow-up travel, the air resistance acting on the vehicle traveling behind the preceding vehicle is reduced by the windshield effect of the preceding vehicle, and the fuel consumption or the power consumption in the rear vehicle is reduced. At this time, the effect of reducing the air resistance changes according to the characteristics of the preceding vehicle. For example, in a case where the preceding vehicle is a large vehicle, the effect of reducing the air resistance is greater than in a case where the preceding vehicle is a small vehicle.

For this reason, it is desirable to propose to the occupant of the vehicle the follow-up travel to the preceding vehicle such that the effect obtained by the follow-up travel becomes as large as possible. However, if the follow-up travel to the preceding vehicle is continuously proposed to the occupant of the vehicle who does not desire the follow-up travel, the occupant of the vehicle may feel the proposal troublesome. Further, it is inconvenient for the occupant of the vehicle to perform an operation for stopping the proposal of the follow-up travel.

Therefore, in view of the above problems, an object of the present disclosure is to stop the proposal of the follow-up travel without requiring an operation by the occupant when the occupant of the vehicle does not desire the follow-up travel.

Solution to Problem

The summary of the present disclosure is as follows.
(1) A follow-up travel support device comprising a processor configured to: acquire information about surrounding vehicles around a host vehicle; select a preceding vehicle suitable as a follow-up target of the host vehicle based on the information about the surrounding vehicles; and propose to an occupant of the host vehicle a follow-up travel to the preceding vehicle by the host vehicle, wherein the processor is configured to stop proposal of the follow-up travel when the follow-up travel is not started despite the proposal of the follow-up travel.

(2) The follow-up travel support device described in above (1), wherein the processor is configured to stop the proposal of the follow-up travel when the follow-up travel is not started until the proposal of the follow-up travel is continued for a predetermined period of time.

(3) The follow-up travel support device described in above (2), wherein the processor is configured to increase the predetermined period of time as a suitability degree of the preceding vehicle as a follow-up target is higher.

(4) The follow-up travel support device described in above (1), wherein the processor is configured to stop the proposal of the follow-up travel when the follow-up travel is not started even though the follow-up travel has been proposed a predetermined number of times.

(5) The follow-up travel support device described in above (4), wherein the processor is configured to increase the predetermined number of times as a suitability degree of the preceding vehicle as the follow-up target is higher.

(6) The follow-up travel support device described in any one of above (1) to (5), wherein when a situation in which the follow-up travel is not started despite the proposal of the follow-up travel is continued for a predetermined number of trips, the processor is configured not to propose the follow-up travel in next and subsequent trips.

(7) The follow-up travel support device described in any one of above (1) to (5), wherein the processor is configured to continue the proposal of the follow-up travel when it is difficult for the host vehicle to move behind the preceding vehicle even though the follow-up travel is not started despite the proposal of the follow-up travel.

(8) A follow-up travel support method executed by a computer, comprising: acquiring information about surrounding vehicles around a host vehicle; selecting a preceding vehicle suitable as a follow-up target of the host vehicle based on the information about the surrounding vehicles; proposing a follow-up travel to the preceding vehicle by the host vehicle to an occupant of the host vehicle; and stopping proposal of the follow-up travel when the follow-up travel is not started despite the proposal of the follow-up travel.

(9) A non-transitory recording medium having recorded thereon a computer program, the computer program causing a computer to: acquire information about surrounding vehicles around a host vehicle; select a preceding vehicle suitable as a follow-up target of the host vehicle based on information about the surrounding vehicles; propose a follow-up travel to the preceding vehicle by the host vehicle to an occupant of the host vehicle; and stop the proposal of the follow-up travel when the follow-up travel is not started despite the proposal of the follow-up travel.

According to the present disclosure, it is possible to stop the proposal of the follow-up travel without requiring an operation by the occupant when the occupant of the vehicle does not desire the follow-up travel.

DESCRIPTION OF EMBODIMENTS

Figure 1:
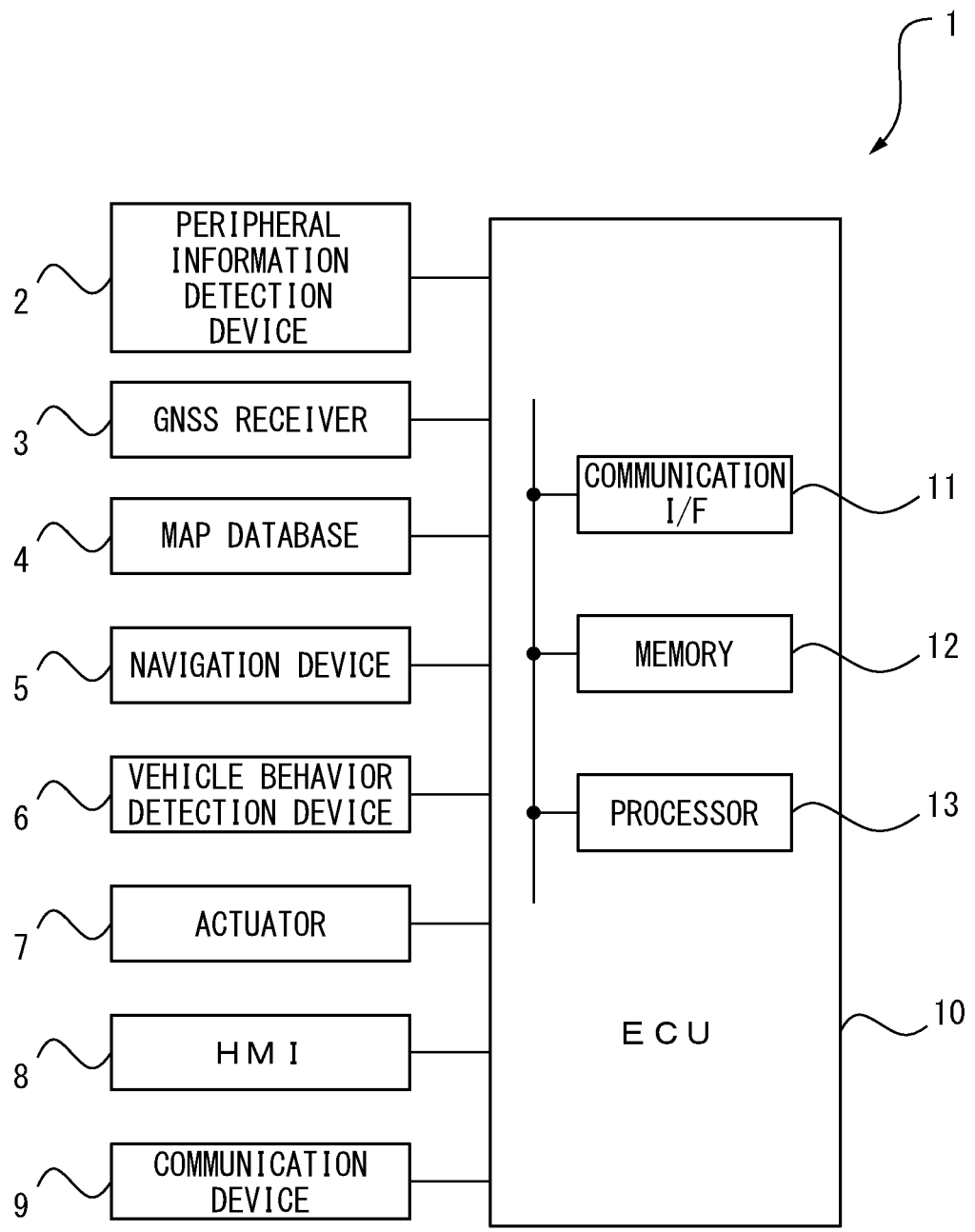
FIG. 1 is a schematic configuration diagram of a vehicle control system including a follow-up travel support device according to a first embodiment of the present disclosure.

Hereinafter, embodiments of the present disclosure will be described in detail with reference to the drawings. In the follow-up description, the same reference numerals are given to the same constituent elements.

First Embodiment

Hereinafter, a first embodiment of the present disclosure will be described referring to FIG. 1 to FIG. 5.

FIG. 1 is a schematic configuration diagram of the vehicle control system 1 including the follow-up travel support device according to the first embodiment of the present disclosure. The vehicle control system 1 is mounted on a vehicle and executes various types of control of the vehicle.

As shown in FIG. 1, the vehicle control system 1 comprises a peripheral information detection device 2, a GNSS (Global Navigation Satellite System) receiver 3, a map database 4, a navigation device 5, a vehicle behavior detection device 6, an actuator 7, a human machine interface (HMI) 8, a communication device 9 and an electronic control unit (ECU) 10. The peripheral information detection device 2, the GNSS receiver 3, the map database 4, the navigation device 5, the vehicle behavior detection device 6, the actuator 7, the HMI 8 and the communication device 9 are electrically connected to the ECU 10 via an in-vehicle network compliant with standards such as CAN (Controller Area Network).

The peripheral information detection device 2 acquires data (images, point cloud data, and the like) around the vehicle (the host vehicle) and detects surrounding information (for example, a surrounding vehicle, a lane, and the like) of the vehicle. For example, the peripheral information detection device 2 may include a millimeter-wave radar, a camera (e.g., a stereo camera), a LIDAR: Laser Imaging Detection And Ranging, or an ultrasonic sensor (sonar), or any combination thereof. Output of the peripheral information detection device 2, that is, the peripheral information of the vehicles detected by the peripheral information detection device 2 is transmitted to the ECU 10.

The GNSS receiver 3 detects the present position of the vehicle (for example, the latitude and longitude of the vehicle) based on the positioning information obtained from a plurality of (for example, three or more) positioning satellites. Specifically, the GNSS receiver 3 captures a plurality of positioning satellites and receives radio waves transmitted from the positioning satellites. Then, the GNSS receiver 3 calculates the distance to the positioning satellite based on the difference between the transmission time and the reception time of the radio wave, and detects the present position of the vehicle based on the distance to the positioning satellite and the position (orbit information) of the positioning satellite. The output of the GNSS receiver 3, i.e. the present position of the vehicles detected by the GNSS receiver 3, is transmitted to the ECU 10. A GPS receiver is an example of the GNSS receiver.

The map database 4 stores map information. The ECU 10 obtains map information from the map database 4. Note that a map database may be provided outside the vehicle (e.g., server, etc.), and the ECU 10 may acquire map information from outside the vehicle.

The navigation device 5 sets the travel route of the vehicle to the destination based on the present position of the vehicle detected by the GNSS receiver 3, the map information of the map database 4, the input by the occupant (for example, a driver) of the vehicle, and the like. The travel route set by the navigational device 5 is sent to the ECU 10.

The vehicle behavior detecting device 6 detects a parameter indicating the behavior of the vehicle. The vehicle behavior detecting device 6 includes, for example, a vehicle speed sensor that detects the speed of the vehicle, a turning angle sensor that detects the turning angle of the vehicle (turning angle of the steered wheels), and the like. The output of the vehicle behavior detecting device 6, i.e. the parameters detected by the vehicle behavior detection device 6, is transmitted to the ECU 10.

The actuator 7 operates the vehicle. For example, the actuator 7 includes a drive device for acceleration of the vehicle (for example, at least one of an internal combustion engine and an electric motor), a brake actuator for braking the vehicle, a steering actuator for steering the vehicle, and the like. The ECU 10 controls the actuator 7 to control the behavior of the vehicle.

In the present embodiment, the vehicle control system 1 functions as an advanced driving assistant system (ADAS) and controls the actuator 7 to realize a predetermined driving assistance function. The predetermined driving assistance function includes, for example, an adaptive cruise control (ACC) that automatically controls the velocity of the vehicle according to the presence or absence of the preceding vehicle, a lane keeping assist (LKA) or a lane tracing assist (LTA) that automatically controls the steering of the vehicle so that the vehicle is maintained in the lane, and the like.

The HMI 8 transmits and receives data between the vehicle and an occupant (for example, a driver) of the vehicle. The HMI 8 includes an output unit (for example, a display, a speaker, a vibrating unit, and the like) that provides information to an occupant of the vehicle, and an input unit (for example, a touch panel, an operation button, an operation switch, a microphone, and the like) to which information is input by the occupant of the vehicle. The output of the ECU 10 is notified to the occupant of the vehicle via the HMI 8, and the input from the occupant of the vehicle is transmitted to the ECU 10 via the HMI 8. The HMI 8 is an example of an input device, output device, or input/output device. Note that a mobile terminal (smart phone, tablet terminal, or the like) of an occupant of the vehicle may be connected to the ECU 10 so as to be able to communicate with each other by wire or wirelessly, and may function as the HMI 8. The HMI 8 may be integral with the navigational device 5.

The communication device 9 is capable of communicating with the outside of the vehicle, and enables communication between the vehicle and the outside of the vehicle. For example, the communication device 9 includes a wide area communication device that enables wide area communication between the vehicle and the outside of the vehicle (e.g., a server) via a communication network such as a carrier network or an Internet network, an inter-vehicle communication device that enables inter-vehicle communication between the vehicle and the surrounding vehicle using a predetermined frequency band, and a road-to-vehicle communication device that enables road-to-vehicle communication between the vehicle and the roadside device using a predetermined frequency band.

The ECU 10 performs various controls of the vehicles. As shown in FIG. 1, the ECU 10 comprises a communication interface 11, a memory 12 and a processor 13. The communication interface 11 and the memory 12 are connected to the processor 13 via a signal line. In the present embodiment, one ECU 10 is provided, but a plurality of ECUs may be provided for each function.

The communication interface 11 has interface circuitry for connecting the ECU 10 to the in-vehicle networking. The ECU 10 is connected to other in-vehicle devices via the communication interface 11.

The memory 12 includes, for example, a volatile semiconductor memory and a non-volatile semiconductor memory. The memory 12 stores programs, data, and the like used when various kinds of processing are executed by the processor 13.

The processor 13 comprises one or more CPU (Central Processing Unit) and its peripheral circuitry. The processor 13 may further include an arithmetic circuit such as a logical arithmetic unit or a numerical arithmetic unit.

In order to reduce the amount of fuel or electric power required for the vehicle to travel, it is effective to reduce the air resistance during the travel. As a method for reducing the air resistance during travel, a follow-up travel in which the vehicle is made to follow the preceding vehicle is exemplified. In the follow-up travel, the air resistance acting on the vehicle traveling behind the preceding vehicle is reduced by the windshield effect of the preceding vehicle. Incidentally, platooning in which a plurality of vehicles travel in a platoon is an example of the follow-up travel.

Figure 2:
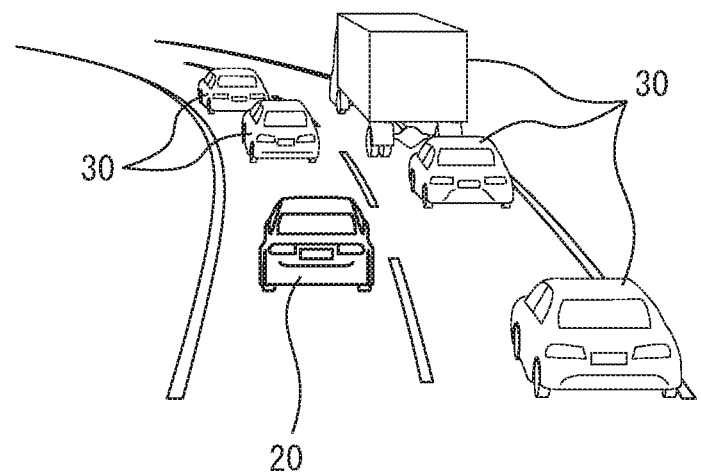
FIG. 2 is an example of a scene in which a plurality of vehicles are traveling on an automobile road.

FIG. 2 is an example of a scene in which a plurality of vehicles are traveling on an automobile road. In FIG. 2 case, five surrounding vehicles 30 are traveling around the host vehicle 20. In such a situation, a plurality of vehicles (five surrounding vehicles 30) become preceding vehicle candidates of the host vehicle 20 in the follow-up travel.

In the case where the host vehicle performs the follow-up travel, it is desirable that the preceding vehicle in the follow-up travel is selected so that the effect obtained by the follow-up travel becomes as large as possible. Therefore, in the present embodiment, the ECU 10 provided in the host vehicle functions as the follow-up travel support device that supports the follow-up travel of the host vehicle, and proposes the follow-up travel to an appropriate preceding vehicle to the occupant of the host vehicle.

Figure 3:
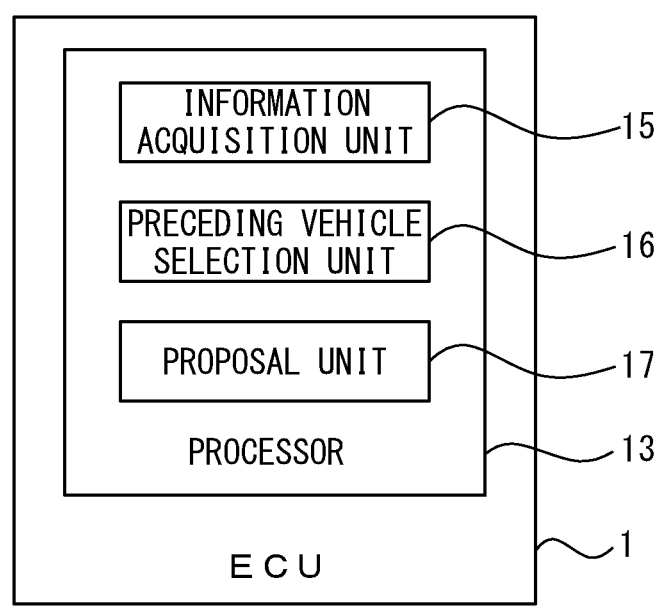
FIG. 3 is a functional diagram of a processor of an ECU.

FIG. 3 is a functional diagram of the processor 13 of the ECU 10. In the present embodiment, the processor 13 includes an information acquisition unit 15, a preceding vehicle selection unit 16, and a proposal unit 17. The information acquisition unit 15, the preceding vehicle selection unit 16, and the proposal unit 17 are functional modules realized by the ECU 10 processor 13 executing programs stored in the memories 12 of the ECU 10. These functional modules may be realized by dedicated arithmetic circuits provided in the processor 13.

The information acquisition unit 15 acquires information about surrounding vehicles around the host vehicle. For example, the information acquisition unit 15 acquires information about the surrounding vehicles from the surrounding vehicles around the host vehicle via the inter-vehicle communication.

The preceding vehicle selection unit 16 selects a preceding vehicle suitable as a follow-up target of the host vehicle on the basis of the information on the surrounding vehicles. For example, the preceding vehicle selection unit 16 extracts preceding vehicle candidates travel in the same direction as the host vehicle from among the surrounding vehicles on the basis of the information on the surrounding vehicles, and calculates a suitability degree of each preceding vehicle candidate as a follow-up target. Then, the preceding vehicle selection unit 16 selects the preceding vehicle candidate having the highest degree of suitability as the preceding vehicle.

The proposal unit 17 proposes to the occupant of the host vehicle the follow-up travel by the host vehicle to the preceding vehicle. For example, the proposal unit 17 proposes the follow-up travel to the preceding vehicle by notifying the occupant of the host vehicle of the preceding vehicle selected by the preceding vehicle selection unit 16 via the HMI 8. However, if the occupant of the host vehicle who does not wish to follow the vehicle continues to be proposed to follow the preceding vehicle, the occupant of the host vehicle may feel that the proposal is troublesome.

Therefore, when the follow-up travel is not started in response to the proposal of the follow-up travel, the proposal unit 17 stops the proposal of the follow-up travel. In other words, in a case where the follow-up travel is not started despite the proposal of the follow-up travel, the proposal unit 17 stops the proposal of the follow-up travel. Accordingly, when the occupant of the host vehicle does not wish to follow the vehicle, the proposal of the follow-up travel can be stopped without requiring an operation by the occupant.

For example, the proposal unit 17 stops the proposal of the follow-up travel when the follow-up travel is not started until a predetermined time elapses after the proposal of the follow-up travel is started. In other words, the proposal unit 17 stops the proposal of the follow-up travel when the follow-up travel is not started until the proposal of the follow-up travel is continued for a predetermined period of time. As a result, it is possible to prevent the occupant of the host vehicle who does not wish to follow the vehicle from continuing to be proposed to follow the vehicle.

Figure 4:
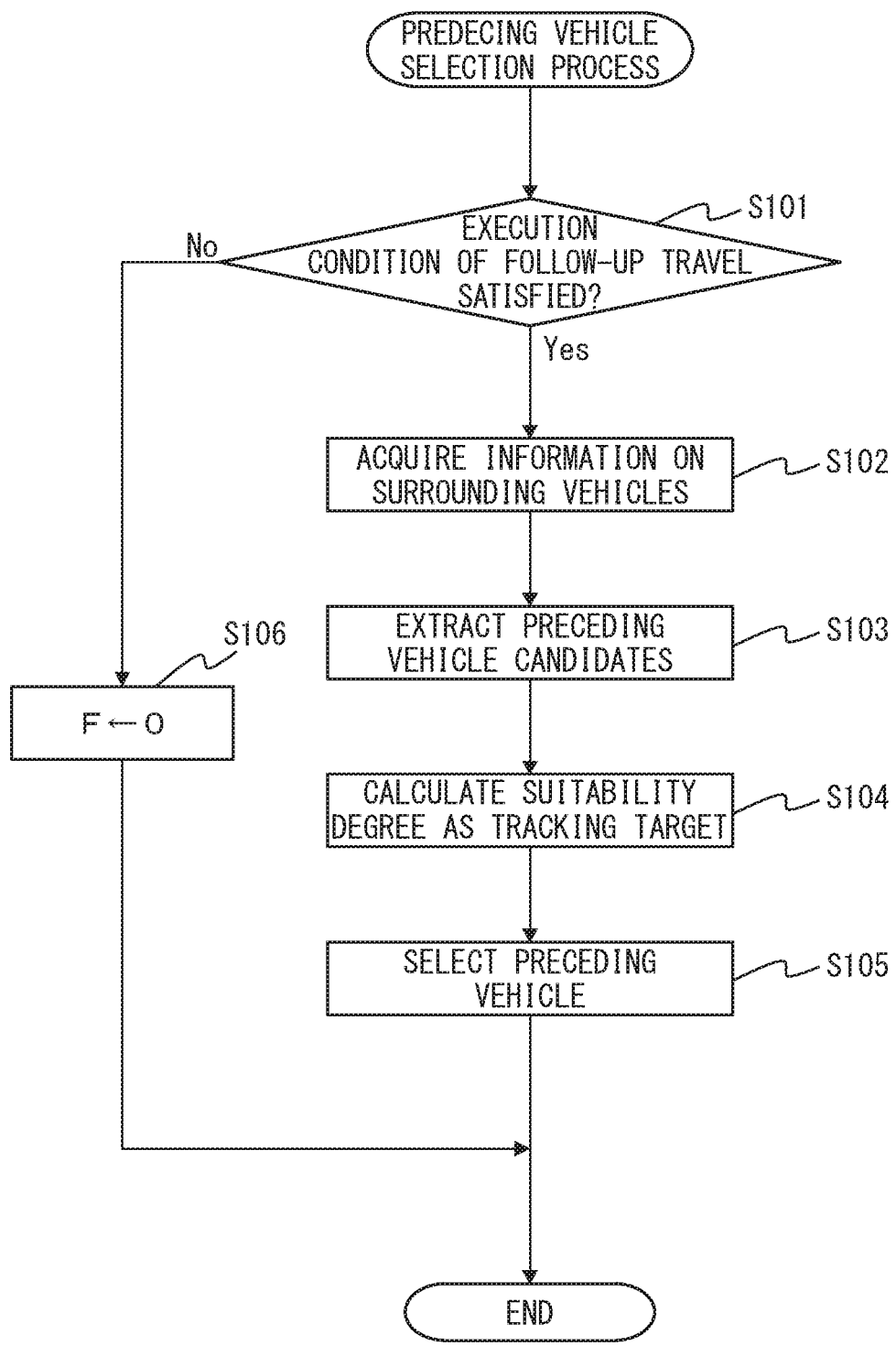
FIG. 4 is a flow chart showing the control routine of the preceding vehicle selection process according to the first embodiment.
Figure 5:
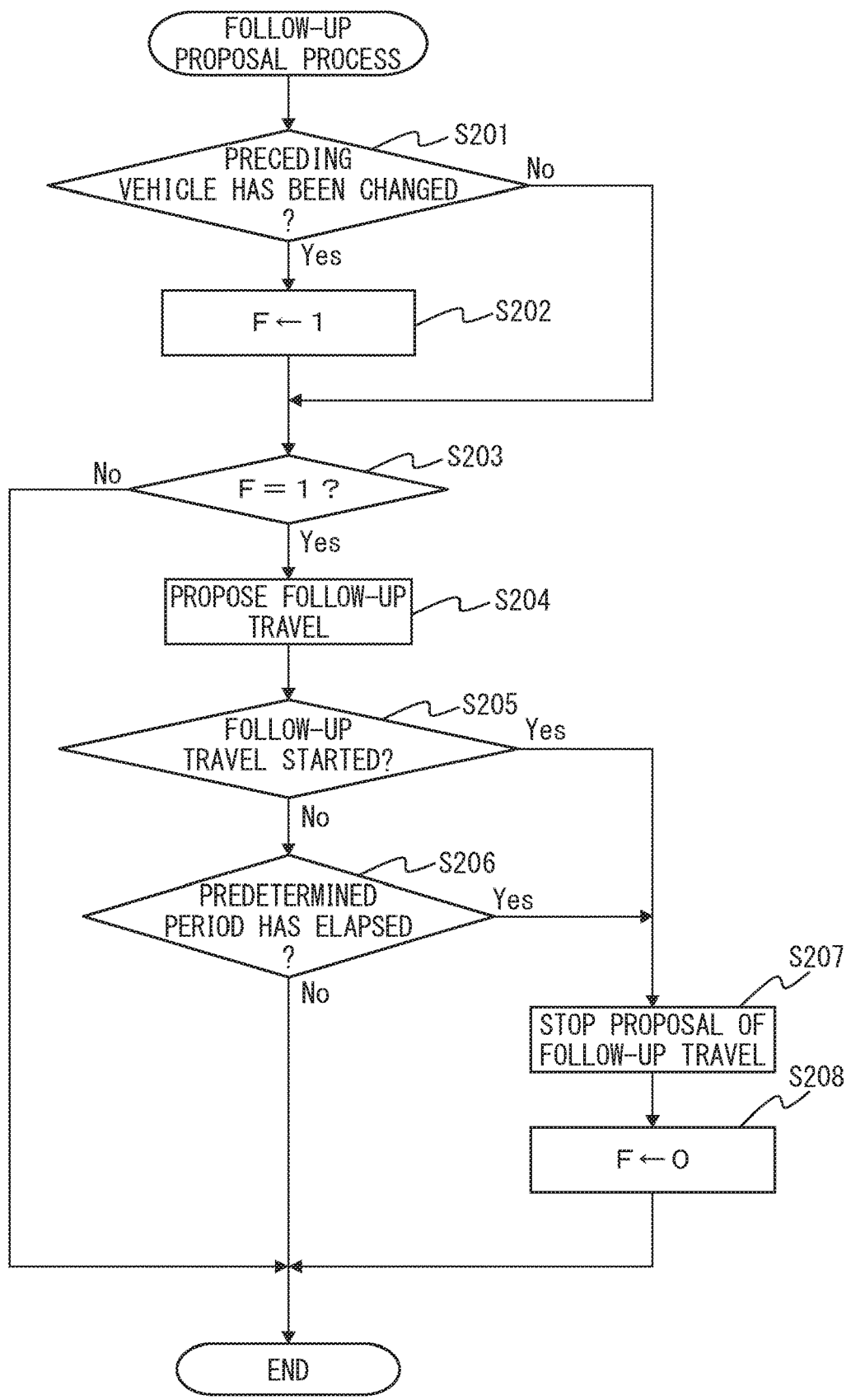
FIG. 5 is a flow chart showing the control routine of the follow-up proposal process according to the first embodiment.

Referring to FIG. 4 and FIG. 5, the process flow of the above-described control will be described in detail. FIG. 4 is a flow chart showing the control routine of the preceding vehicle selection process according to the first embodiment. The control routine is repeatedly executed by the processor 13 of the ECU 10 at predetermined execution intervals.

First, in the step S101, the preceding vehicle selection unit 16 determines whether or not the execution condition of the follow-up travel is satisfied. The execution condition of the follow-up travel is determined in advance and is satisfied, for example, when ACC is operated. The ACC is operated in response to an operation by an occupant of the host vehicle. The execution condition of the follow-up travel may be that the host vehicle is traveling on an automobile dedicated road at a speed equal to or higher than a predetermined value, or the like. If it is determined in step S101 that the execution condition of the follow-up travel is satisfied, the present control routine proceeds to step S102.

In the step S102, the information acquisition unit 15 acquires information on surrounding vehicles around the host vehicle via the inter-vehicle communication. Specifically, the information acquisition unit 15 communicates with the surrounding vehicles located within the communication range of the inter-vehicle communication, and receives information on the surrounding vehicles from the surrounding vehicles. For example, the information transmitted from the surrounding vehicle via the inter-vehicle communication includes a current position (latitude and longitude) of the surrounding vehicle, a traveling azimuth angle of the surrounding vehicle, a speed of the surrounding vehicle, a vehicle width of the surrounding vehicle, a vehicle length, and the like.

After the step S102, in step S103, the preceding vehicle selection unit 16 extracts the preceding vehicle candidates traveling in the same direction as the host vehicle from the surrounding vehicles based on the information about the surrounding vehicles.

Next, in the step S104, the preceding vehicle selection unit 16 calculates, for each of the preceding vehicle candidates, a suitability degree as a tracking target. Basically, the larger the forward projected area of the preceding vehicle candidate, the smaller the air resistance acting on the host vehicle when the host vehicle follows the preceding vehicle candidate, and the larger the effect obtained by the follow-up travel. For this reason, the preceding vehicle selection unit 16 calculates, for example, the suitability degree as the follow-up target of the preceding vehicle candidate based on the forward projected area of the preceding vehicle candidate. The front projection area is calculated based on the vehicle width and the vehicle length by using a map or the like, and as the front projection area increases, the suitability degree is increased. The vehicle width and the vehicle height of the surrounding vehicle may be transmitted to the host vehicle via the inter-vehicle communication, and the front projection area may be calculated by multiplying the vehicle width by the vehicle height, or the front projected area of the surrounding vehicle may be transmitted to the host vehicle via the inter-vehicle communication.

The suitability degree of the preceding vehicle candidate as the tracking target may be calculated based on a parameter other than the forward projected area (for example, the relative speed between the host vehicle and the preceding vehicle candidate, the vehicle speed stability of the preceding vehicle candidate, and the like). Moreover, the suitability degree does not necessarily have to be calculated as a detailed numerical value. For example, the suitability degree may be expressed as two levels (large and small) or three levels (large, medium and small).

Next, in the step S105, the preceding vehicle selection unit 16 selects the preceding vehicle candidate with the highest suitability degree as the preceding vehicle. When there are a plurality of preceding vehicle candidates having the same suitability, for example, the preceding vehicle candidate closest to the host vehicle is selected as the preceding vehicle. Further, when only one surrounding vehicle is extracted as the preceding vehicle candidate, the surrounding vehicle is selected as the preceding vehicle. After the step S105, the control routine ends.

On the other hand, if it is determined in the step S101 that the follow-up travel is not satisfied, the present control routine proceeds to the step S106. In the step S106, the preceding vehicle selection unit 16 resets the proposal flag F to zero. After the step S106, the control routine ends.

In the step S102, the information acquisition unit 15 may acquire information about the surrounding vehicles around the host vehicle based on the output of the surrounding information detecting device 2 or via the road-to-vehicle communication.

FIG. 5 is a flow chart showing the control routine of the follow-up proposal process according to the first embodiment. The control routine is repeatedly executed by the processor 13 of the ECU 10 at predetermined execution intervals.

First, in the step S201, the proposal unit 17 determines whether or not the preceding vehicle selected by the preceding vehicle selection unit 16 has been changed. If it is determined that the preceding vehicle has been changed, the control routine proceeds to the step S202.

In the step S202, the proposal unit 17 sets the proposal flag F to 1. After the step S202, the control routine proceeds to step S203. On the other hand, if it is determined in step S201 that the preceding vehicle has not been changed, the present control routine skips step S202 and proceeds to step S203.

In the step S203, the proposal unit 17 determines whether or not the proposal flag F is set to 1. If it is determined that the proposal flag F is set to 1, the control routine proceeds to step S204.

In the step S204, the proposal unit 17 proposes to an occupant (for example, a driver) of the host vehicle that the host vehicle follows the preceding vehicle. For example, the proposal unit 17 proposes the follow-up travel to the preceding vehicle by notifying the occupant of the host vehicle of the preceding vehicle selected by the preceding vehicle selection unit 16 via HMI 8. For example, when the surrounding vehicle 30 of the host vehicle 20 is displayed on the display of the HMI 8 as shown in FIG. 2, the proposal unit 17 displays the surrounding vehicle selected as the preceding vehicle in a display mode (for example, transparency, brightness, color (hue), color brightness, color saturation, and the like) that is different from the other surrounding vehicles 30. In addition, the proposal unit 17 may notify the occupant of the host vehicle of the preceding vehicle by audio via the speaker of the HMI 8.

Next, in the step S205, the proposal unit 17 determines whether or not the follow-up travel by the host vehicle to the preceding vehicle is started. For example, the proposal unit 17 determines that the follow-up travel is started when the host vehicle is located behind the preceding vehicle on the same lane and the distance between the host vehicle and the preceding vehicle becomes equal to or smaller than a predetermined value. This determination is performed, for example, on the basis of an output of the peripheral information detection device 2. In addition, when the preceding vehicle is located in a lane different from the host vehicle, the proposal unit 17 may determine that the follow-up travel is started when the host vehicle starts changing the lane to the lane of the preceding vehicle. This determination is made, for example, on the basis of the steering angle sensor of the vehicle-behavior detecting device 6. In addition, the proposal unit 17 may determine that the follow-up travel is started when the occupant of the host vehicle approves the proposal of the follow-up travel via the HMI 8.

If it is determined in step S205 that the follow-up travel has not been started, the present control routine proceeds to step S206. In the step S206, the proposal unit 17 determines whether or not a predetermined period has elapsed since the proposal of the follow-up travel was started. In other words, the proposal unit 17 determines whether or not the proposal for the follow-up travel has been continued for a predetermined period of time. When it is determined that the predetermined period has not elapsed in the step S206, the present control routine ends.

On the other hand, if it is determined in the step S205 that the follow-up travel has been started, or if it is determined in the step S206 that the predetermined period has elapsed, the present control routine proceeds to the step S207. In the step S207, the proposal unit 17 stops the proposal of the follow-up travel. For example, the proposal unit 17 stops the notification of the preceding vehicle to the occupant of the host vehicle.

After the step S207, in the step S208, the proposal unit 17 resets the proposal flag F to zero. After the step S208, the control routine ends.

Instead of continuously proposing the follow-up travel to the occupant of the host vehicle, the proposal unit 17 may intermittently propose the follow-up travel to the occupant of the host vehicle. In this case, for example, in the step S206, the proposal unit 17 determines whether or not the number of proposals for the follow-up travel has reached a predetermined number of times. That is, the proposal unit 17 stops the proposal of the follow-up travel when the follow-up travel is not started even though the follow-up travel has been proposed a predetermined number of times. As a result, it is possible to prevent the occupant of the host vehicle who does not wish to follow the vehicle from continuing to be proposed to follow the vehicle.

Second Embodiment

The configuration and control of the follow-up travel support device according to the second embodiment are basically the same as the configuration and control of the follow-up travel support device according to the first embodiment except for the points described below. Therefore, the second embodiment of the present disclosure will be mainly described below with respect to portions different from the first embodiment.

As described above, when the follow-up travel is not started until the proposal of the follow-up travel is continued for a predetermined period of time, the proposal unit 17 stops the proposal of the follow-up travel. That is, the longer the predetermined time period, the longer the time period for urging the occupant of the host vehicle to follow the vehicle. Further, as the suitability degree of the preceding vehicle as the follow-up target increases, the effect obtained by the follow-up travel increases, and the merit of performing the follow-up travel increases.

Therefore, in the second embodiment, the proposal unit 17 increases the continuous proposal time (predetermined time) until the proposal of the follow-up travel is stopped as the suitability degree of the preceding vehicle selected by the preceding vehicle selection unit 16 as the follow-up target is higher. This makes it possible to propose the follow-up travel to the occupant of the vehicle with an appropriate strength corresponding to the effect obtained by the follow-up travel.

Figure 6:
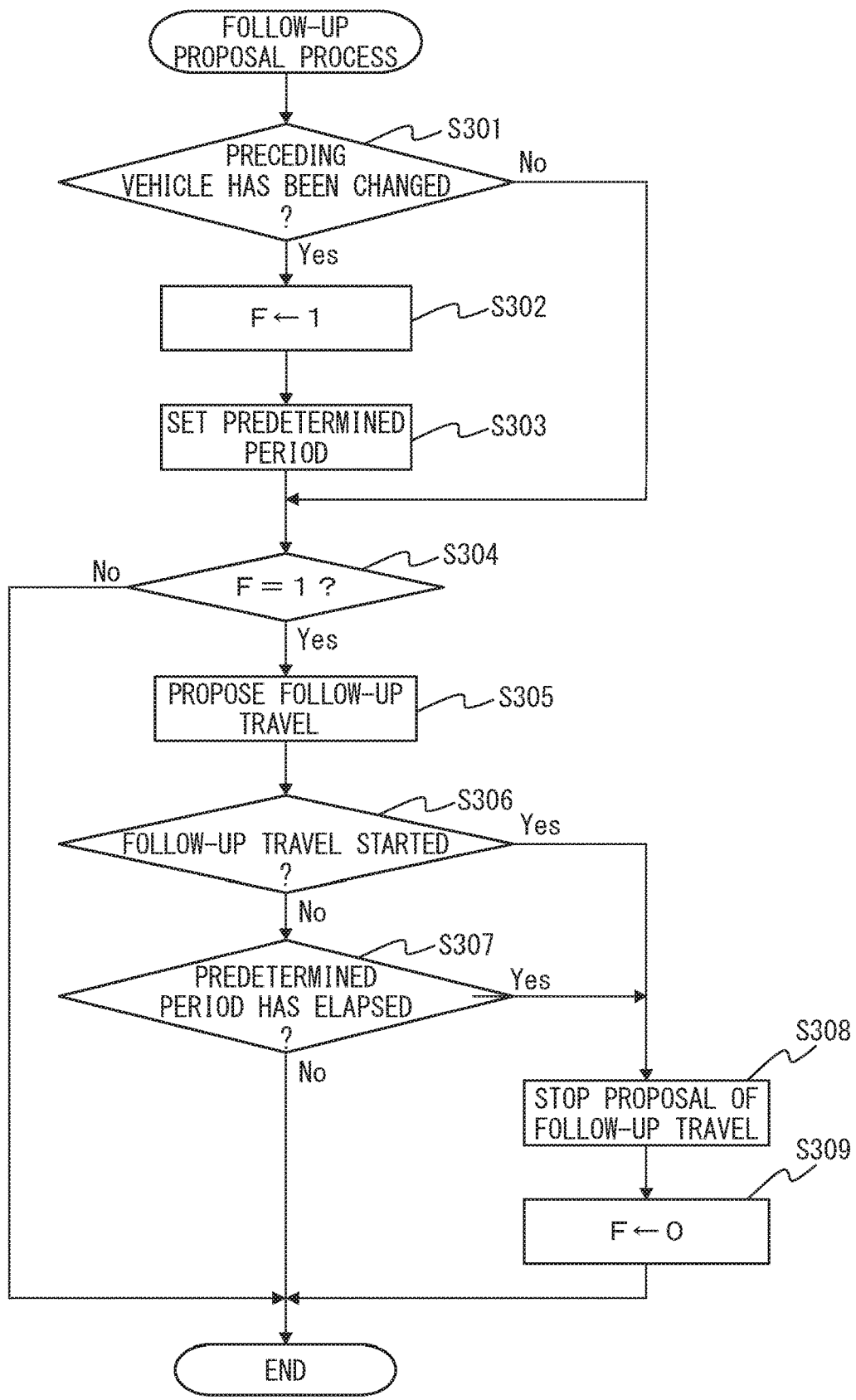
FIG. 6 is a flow chart showing the control routine of the follow-up proposal process according to the second embodiment.

In the second embodiment, as in the first embodiment, the control routine of the preceding vehicle selection process of FIG. 4 is executed. On the other hand, in the second embodiment, instead of the control routine of the follow-up proposal process of FIG. 5, the control routine of the follow-up proposal process of FIG. 6 is executed. FIG. 6 is a flow chart showing the control routine of the follow-up proposal process according to the second embodiment. The control routine is repeatedly executed by the processor 13 of the ECU 10 at predetermined execution intervals.

First, in the step S301, similarly to the step S201 of FIG. 5, the proposal unit 17 determines whether or not the preceding vehicle selected by the preceding vehicle selection unit 16 has been changed. If it is determined that the preceding vehicle has been changed, the control routine proceeds to the step S302.

In the step S302, the proposal unit 17 sets the proposal flag F to 1 as in the step S202 of FIG. 5.

Next, in the step S303, the proposal unit 17 sets a predetermined period based on the suitability degree of the preceding vehicle selected by the preceding vehicle selection unit 16 as the follow-up target. Specifically, the proposal unit 17 increases the predetermined time as the suitability degree increases. The proposal unit 17 acquires, as an appropriate degree as a follow-up target of the preceding vehicle, a value calculated by the preceding vehicle selection unit 16 in the step S104 of FIG. 4.

After step S303, the control routine proceeds to step S304. On the other hand, if it is determined in step S301 that the preceding vehicle has not been changed, the control routine skips step S302 and S303 and proceeds to step S304.

The steps S304 to S309 are executed in the same way as the steps S203 to S208 of FIG. 5. At this time, a value set in the step S303 is used as a predetermined time in the step S306.

As in the first embodiment, the proposal unit 17 may stop the proposal of the follow-up travel when the follow-up travel is not started even though the follow-up travel has been proposed a predetermined number of times. In this case, the proposal unit 17 increases the number of proposals (a predetermined number of times) until the proposal of the follow-up travel is stopped as the suitability degree of the preceding vehicle selected by the preceding vehicle selection unit 16 as the follow-up target is higher. This makes it possible to propose the follow-up travel to the occupant of the vehicle with an appropriate strength corresponding to the effect obtained by the follow-up travel.

Third Embodiment

The configuration and control of the follow-up travel support device according to the third embodiment are basically the same as the configuration and control of the follow-up travel support device according to the first embodiment except for the points described below. Therefore, the third embodiment of the present disclosure will be mainly described below with respect to portions different from the first embodiment.

As described above, in a case where the follow-up travel is not started despite the proposal of the follow-up travel, it is determined that the occupant of the vehicle does not desire the follow-up travel, and the proposal of the follow-up travel is stopped. However, even if the occupant of the vehicle desires to follow, when it is difficult for the host vehicle to move behind the preceding vehicle, the follow-up travel is not started. In such a situation, it is inappropriate to stop the proposal of the follow-up travel contrary to the intention of the occupant of the vehicle.

Therefore, in the third embodiment, the proposal unit 17 continues the proposal of the follow-up travel when it is difficult for the host vehicle to move backward of the preceding vehicle even if the follow-up travel is not started despite the proposal of the follow-up travel. Accordingly, it is possible to prevent the proposal of the follow-up travel from being stopped contrary to the intention of the occupant of the vehicle.

Figure 7:
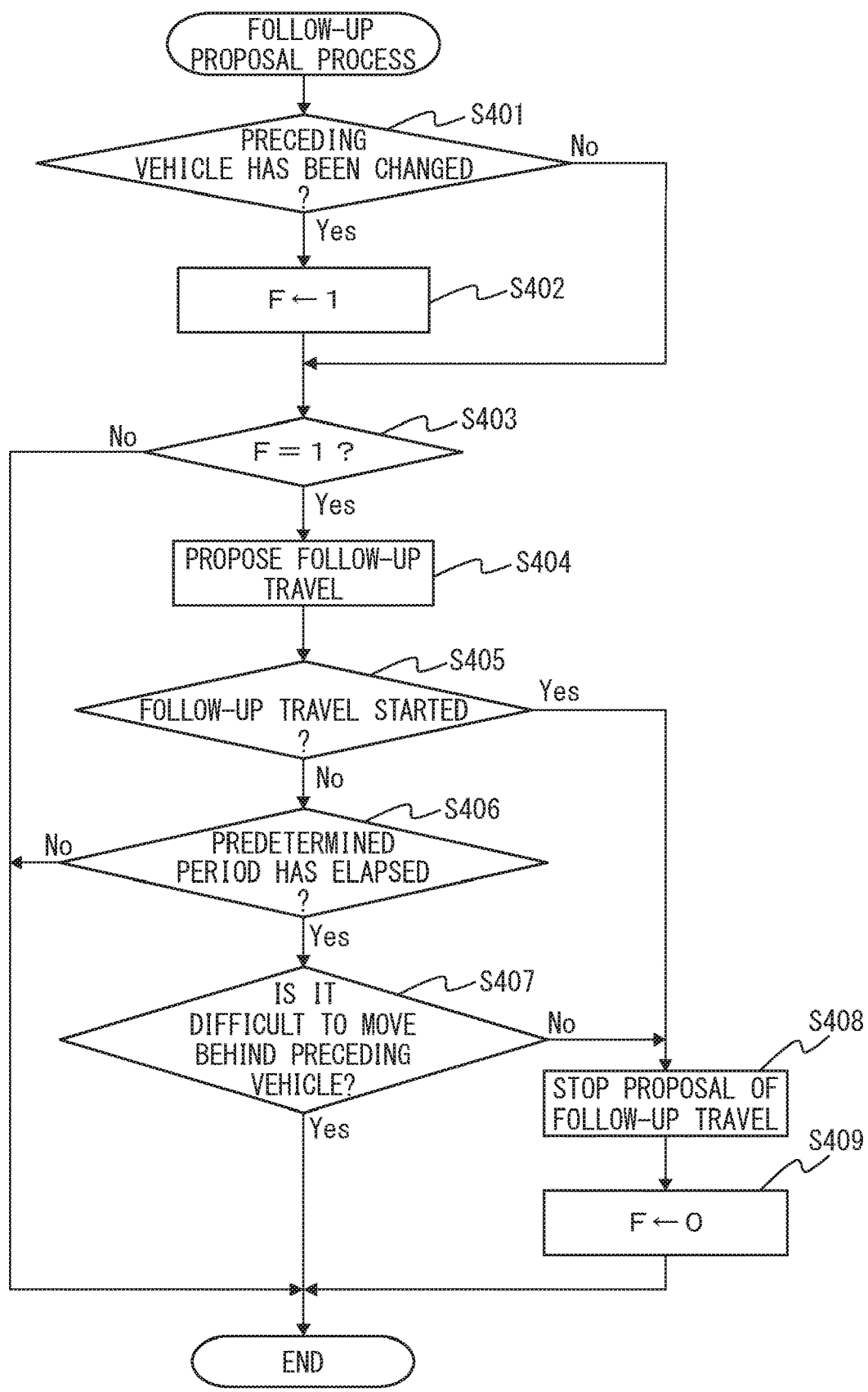
FIG. 7 is a flow chart showing the control routine of the follow-up proposal process according to the third embodiment.

In the third embodiment, as in the first embodiment, the control routine of the preceding vehicle selection process of FIG. 4 is executed. On the other hand, in the third embodiment, instead of the control routine of the follow-up proposal process of FIG. 5, the control routine of the follow-up proposal process of FIG. 7 is executed. FIG. 7 is a flow chart showing the control routine of the follow-up proposal process according to the third embodiment. The control routine is repeatedly executed by the processor 13 of the ECU 10 at predetermined execution intervals.

The steps S401 to S406 are executed in the same way as the steps S201 to S206 of FIG. 5. If it is determined in the step S406 that the predetermined period has elapsed, the present control routine proceeds to step S407.

In the step S407, the proposal unit 17 determines whether or not it is difficult for the host vehicle to move behind the preceding vehicle. For example, the proposal unit 17 determines that it is difficult for the host vehicle to move behind the preceding vehicle when the preceding vehicle is located rearward of the host vehicle. In addition, the proposal unit 17 determines that it is difficult for the host vehicle to move behind the preceding vehicle when there is no space of a predetermined distance behind the preceding vehicle in the lane on which the preceding vehicle is travel. In addition, when the distance from the current position of the host vehicle to the merging point or the diverging point is within the predetermined distance, the proposal unit 17 determines that it is difficult for the host vehicle to move behind the preceding vehicle. The determination of the step S407 is performed, for example, on the basis of the output of the peripheral information detection device 2, the output of the GNSS receiver 3, information received from the surrounding vehicle via the inter-vehicle communication, information received from the roadside device via the road-to-vehicle communication, and the like.

When it is determined that it is difficult for the host vehicle to move behind the preceding vehicle in the step S407, the present control routine ends. On the other hand, if it is determined in the step S407 that it is not difficult for the host vehicle to move behind the preceding vehicle, the control routine proceeds to step S408. In this case, the proposal unit 17 stops the proposal of the follow-up travel in the step S408, and resets the proposal flag F to zero in the step S409. After the step S409, the control routine ends.

Fourth Embodiment

The configuration and control of the follow-up travel support device according to the fourth embodiment are basically the same as the configuration and control of the follow-up travel support device according to the first embodiment except for the points described below. Therefore, the fourth embodiment of the present disclosure will be mainly described below with respect to portions different from the first embodiment.

In a case where the occupant of the host vehicle does not intend to follow the vehicle, it is assumed that the occupant of the host vehicle continues to ignore the proposal for follow-up travel. In such a case, repeating the proposal of the follow-up travel and the cancellation of the proposal of the follow-up travel may cause discomfort to the occupant of the vehicle.

Therefore, in the fourth embodiment, when the situation in which the follow-up travel is not started despite the proposal of the follow-up travel is continued for a predetermined number of trips, the proposal unit 17 does not propose the follow-up travel in the next and subsequent trips. As a result, it is possible to prevent the follow-up travel from being repeatedly proposed to the occupant of the host vehicle who does not intend to perform the follow-up travel. The trip means a period from when the ignition switch of the vehicle is turned on until when the ignition switch of the vehicle is turned off.

In the fourth embodiment, as in the first embodiment, the control routine of the preceding vehicle selection process of FIG. 4 and the control routine of the follow-up proposal process of FIG. 5 are executed. In the fourth embodiment, the execution condition of the follow-up travel used in the determination of the step S101 of FIG. 4 includes that a situation in which the follow-up travel is not started despite the proposal of the follow-up travel is not continued for a predetermined number of trips. That is, when a situation in which the follow-up travel is not started despite the proposal of the follow-up travel is continued for a predetermined number of trips, it is determined that the execution condition of the follow-up travel is not satisfied. Consequently, the proposal flag F is reset to zero in the step S106 of FIG. 4, and the proposal of the follow-up travel by the proposal unit 17 is prohibited.

Other Embodiments

While preferred embodiments of the present disclosure have been described above, the present disclosure is not limited to these embodiments, and various modifications and changes can be made within the scope of the claims.

For example, the vehicle in which the follow-up travel support device is provided may be a manual driving vehicle that does not have a driving assistance function. In this case, the acceleration/deceleration of the vehicle in the follow-up travel is controlled by the driver of the vehicle. Further, the vehicle provided with the follow-up travel support device may be a fully automated driving vehicle in which all of acceleration, steering, and deceleration (braking) of the vehicle are automatically executed. In this case, the follow-up travel is automatically started when the occupant of the vehicle accepts the proposal of the follow-up travel via the HMI 8.

In addition, a computer program that causes a computer to realize the functions of the respective units included in the processor 13 of the ECU 10 may be provided in a form stored in a computer-readable recording medium. The computer-readable recording medium is, for example, a magnetic recording medium, an optical recording medium, or a semiconductor memory.

Further, the above-described embodiments can be implemented in any combination. For example, when the second embodiment is combined with the third embodiment, the steps S302 and S303 of FIG. 6 are executed instead of the step S402 in the control routine of the follow-up proposal process of FIG. 7.

DESCRIPTION OF SYMBOLS

10 Electronic control unit (ECU)
13 Processor
15 Information acquisition unit
16 Preceding vehicle selection unit
17 Proposal unit
20 Host vehicle
30 Surrounding vehicles

The invention claimed is:

1. A follow-up travel support device comprising an electronic control unit including a communication interface, memory, and a processor configured to execute programs stored in the memory in order to:

acquire information about surrounding vehicles around a host vehicle;
control a velocity of the host vehicle based on the presence or absence of preceding vehicles using a driving assistance function and an actuator having a drive device for acceleration of the host vehicle;
select a preceding vehicle suitable as a follow-up target of the host vehicle based on the information about the surrounding vehicles; and
propose to an occupant of the host vehicle a follow-up travel to the preceding vehicle by the host vehicle,
wherein the processor is configured to stop proposal of the follow-up travel when the follow-up travel is not started despite the proposal of the follow-up travel, and
wherein when a situation in which the follow-up travel is not started despite the proposal of the follow-up travel is continued for a predetermined number of trips, the processor is configured not to propose the follow-up travel in next and subsequent trips.

2. The follow-up travel support device according to claim 1, wherein the processor is configured to stop the proposal of the follow-up travel when the follow-up travel is not started until the proposal of the follow-up travel is continued for a predetermined period of time.

3. The follow-up travel support device according to claim 2, wherein the processor is configured to increase the predetermined period of time as a suitability degree of the preceding vehicle as a follow-up target is higher.

4. The follow-up travel support device according to claim 1, wherein the processor is configured to stop the proposal of the follow-up travel when the follow-up travel is not started even though the follow-up travel has been proposed a predetermined number of times.

5. The follow-up travel support device according to claim 4, wherein the processor is configured to increase the predetermined number of times as a suitability degree of the preceding vehicle as the follow-up target is higher.

6. A follow-up travel support method executed by a computer including a communication interface, memory, and a processor, comprising:
acquiring information about surrounding vehicles around a host vehicle;
controlling a velocity of the host vehicle based on the presence or absence of preceding vehicles using a driving assistance function and an actuator having a drive device for acceleration of the host vehicle;
selecting a preceding vehicle suitable as a follow-up target of the host vehicle based on the information about the surrounding vehicles;
proposing a follow-up travel to the preceding vehicle by the host vehicle to an occupant of the host vehicle; and
stopping proposal of the follow-up travel when the follow-up travel is not started despite the proposal of the follow-up travel,
wherein when a situation in which the follow-up travel is not started despite the proposal of the follow-up travel is continued for a predetermined number of trips, the processor is configured not to propose the follow-up travel in next and subsequent trips.

7. A non-transitory recording medium having recorded thereon a computer program configured to be executed by a processor of a computer, the computer program causing the computer to:
acquire information about surrounding vehicles around a host vehicle;
control a velocity of the host vehicle based on the presence or absence of preceding vehicles using a driving assistance function and an actuator having a drive device for acceleration of the host vehicle;
select a preceding vehicle suitable as a follow-up target of the host vehicle based on information about the surrounding vehicles;
propose a follow-up travel to the preceding vehicle by the host vehicle to an occupant of the host vehicle; and
stop the proposal of the follow-up travel when the follow-up travel is not started despite the proposal of the follow-up travel,
wherein when a situation in which the follow-up travel is not started despite the proposal of the follow-up travel is continued for a predetermined number of trips, the processor is configured not to propose the follow-up travel in next and subsequent trips.

* * * * *